(12) United States Patent
Homer

(10) Patent No.: US 9,208,290 B2
(45) Date of Patent: Dec. 8, 2015

(54) EXTERNAL STORAGE OF MEDICAL DEVICE TREATMENT PARAMETERS

(76) Inventor: Gregg S. Homer, Laguna Beach, CA (US)

( * ) Notice: Subject to any disclaimer, the term of this patent is extended or adjusted under 35 U.S.C. 154(b) by 78 days.

(21) Appl. No.: 13/458,028

(22) Filed: Apr. 27, 2012

(65) Prior Publication Data

US 2013/0291116 A1 Oct. 31, 2013

(51) Int. Cl.
*G06F 21/10* (2013.01)
*H04N 21/4405* (2011.01)
*G06F 21/00* (2013.01)

(52) U.S. Cl.
CPC ....................... *G06F 21/00* (2013.01)

(58) Field of Classification Search
CPC .. A61B 1/00; A61B 1/00002; A61B 1/00011; A61B 1/00016; A61B 1/00018; A61B 6/545; A61B 6/548; A61B 8/54
USPC ....... 126/204.21; 340/5.64, 5.2, 4.1; 600/300, 301, 331; 606/4; 726/11, 19, 726/26
See application file for complete search history.

(56) References Cited

U.S. PATENT DOCUMENTS

| | | | | | |
|---|---|---|---|---|---|
| 5,742,718 | A | * | 4/1998 | Harman et al. | 385/53 |
| 5,881,088 | A | * | 3/1999 | Zamel et al. | 372/92 |
| 6,145,026 | A | * | 11/2000 | Ziegler | 710/22 |
| 6,149,058 | A | * | 11/2000 | Albaret | 235/380 |
| 2001/0050990 | A1 | * | 12/2001 | Sudia | 380/286 |
| 2004/0215490 | A1 | * | 10/2004 | Duchon et al. | 705/2 |
| 2006/0049957 | A1 | * | 3/2006 | Surgenor et al. | 340/825.19 |
| 2006/0241356 | A1 | * | 10/2006 | Flaherty | 600/301 |
| 2006/0271112 | A1 | * | 11/2006 | Martinson et al. | 607/2 |
| 2007/0209662 | A1 | * | 9/2007 | Bowen et al. | 128/204.21 |
| 2008/0040788 | A1 | * | 2/2008 | Steinkogler et al. | 726/11 |
| 2008/0055039 | A1 | * | 3/2008 | Eberhart et al. | 340/5.2 |
| 2010/0268157 | A1 | * | 10/2010 | Wehba et al. | 604/66 |
| 2011/0106004 | A1 | * | 5/2011 | Eubanks et al. | 604/35 |
| 2012/0116372 | A1 | * | 5/2012 | Degani et al. | 606/4 |

* cited by examiner

*Primary Examiner* — Andrew Nalven
*Assistant Examiner* — Huan V Doan

(57) ABSTRACT

Many electronic medical devices include program design features that direct the operation of the device. The program design features of most electronic medical devices reside in the device itself and therefore are easily discovered by reverse engineering. In most cases, however, these features can be introduced into the device from an external source for only so long as necessary for each operation of the device, thereby making the reverse engineering of these features more difficult (or even impossible) and preserving a greater degree of design secrecy.

28 Claims, 3 Drawing Sheets

EXTERNAL STORAGE OF MEDICAL DEVICE TREATMENT PARAMETERS

BACKGROUND OF THE INVENTION

Patents promote science and the useful arts by affording an important barrier to entry to the inventor in the form of a narrow monopoly over his or her inventions for the duration of the patent term. In the absence of these barriers, third parties could simply appropriate these inventions without any license from or compensation to the inventor, thereby eliminating an important incentive to invent and potentially resulting in the underproduction of innovation.

Patents alone, however, sometimes fail to provide adequate barriers, and in these cases, an innovation deficit remains. Examples of situations in which patents fail to provide such barriers include (a) consumer applications whereby infringement actions against the entire consumer class would be either impractical or devastating to the goodwill of the inventor or his or her assignee, (b) changes in market conditions unanticipated in the specific language of the patent, (c) appropriations occurring after the filing date but before the issuance of the patent, (d) infringements in jurisdictions that either fail to enforce their patents laws effectively or have no patent laws at all, (e) equipment used in the manufacturing process the infringing use of which would be difficult to discover, detect, or prove, and (f) military equipment, the design of which comprises matters of national security.

One barrier to entry available to technological innovators is secrecy. Apple, for example, has long enjoyed long market leads on new products by developing those products under strict confidentiality, and the secrecy of its cola soft drink formula has long been a source of market monopoly for the Coca-Cola Company. To the extent inventors and their assignees can keep the technological parameters of their inventions secret, significant additional barriers can be achieved to supplement those lost by inadequate patent protection.

Design secrecy can be a valuable barrier to entry for many electronic medical devices. Although the physical design features of these devices are easily discovered by reverse engineering, the most valuable features of these devices are often the program design features that direct the operation of the device. Examples of the program design features of a laser device, for example, might include the energy output, beam diameter, pulse width, repetition rate, spot separation, line separation, and number of scans of a laser device. These program design features may be embedded in the device itself or introduced into the device from an external source. If embedded in the device, these features are easily reverse engineered and discovered as well. If, however, these features are introduced into the device from an external source for only so long as necessary for each operation of the device, reverse engineering of these features would difficult, if not impossible, to achieve, and a greater degree of design secrecy would be preserved.

There is therefore a need for a method to introduce the program design features into an electronic medical device from an external source until the occurrence of a specified event, such as the passage of time estimated for the initiation and/or performance of the procedure or tampering with the device or its housing in order to make the reverse engineering of these features more difficult (or even impossible), thereby preserving a greater degree of design secrecy.

BRIEF SUMMARY OF THE INVENTION

Many electronic medical devices include program design features that direct the operation of the device. The program design features that direct the operation of the device can be implemented using one or more computer systems. The program design features of most electronic medical devices reside in the device itself and therefore are easily discovered by reverse engineering. In most cases, however, these features can be introduced into the device from an external source for only so long as necessary for each operation of the device, thereby making the reverse engineering of these features more difficult (or even impossible) and preserving a greater degree of design secrecy.

The program design features of an electronic medical device can comprise software or can be embedded in hardware. If these features comprise software, the software can reside on the device itself, on a removable drive medium (including memory cards, smart cards, flash drives, dongles, CD-ROMs, and digital tape cassettes), or on a remote computer or other external device (in which case all or a portion of the program design features can be delivered via the internet or a WAN, LAN, serial or parallel connection, phone line, cable, fiber optics, satellite transmission, microwave transmission, cellular transmission, radio transmission, regular mail, messenger, or other communications network). If these features are embedded in hardware, the hardware can consist of a microprocessor or other integrated circuit and can reside on the device itself, on a removable medium (including microchips, external GPUs, and external video cards), or on a remote computer or other external device (in which case all or a portion of the program design features can be delivered via the internet or a WAN, LAN, serial or parallel connection, phone line, cable, fiber optics, satellite transmission, microwave transmission, cellular transmission, radio transmission, regular mail, messenger, or other communications network).

Other objects, features, and advantages of the present invention will become apparent upon consideration of the following detailed description and the accompanying drawings, in which like reference designations represent like features throughout the figures.

DETAILED DESCRIPTION OF THE INVENTION

Figure 1:
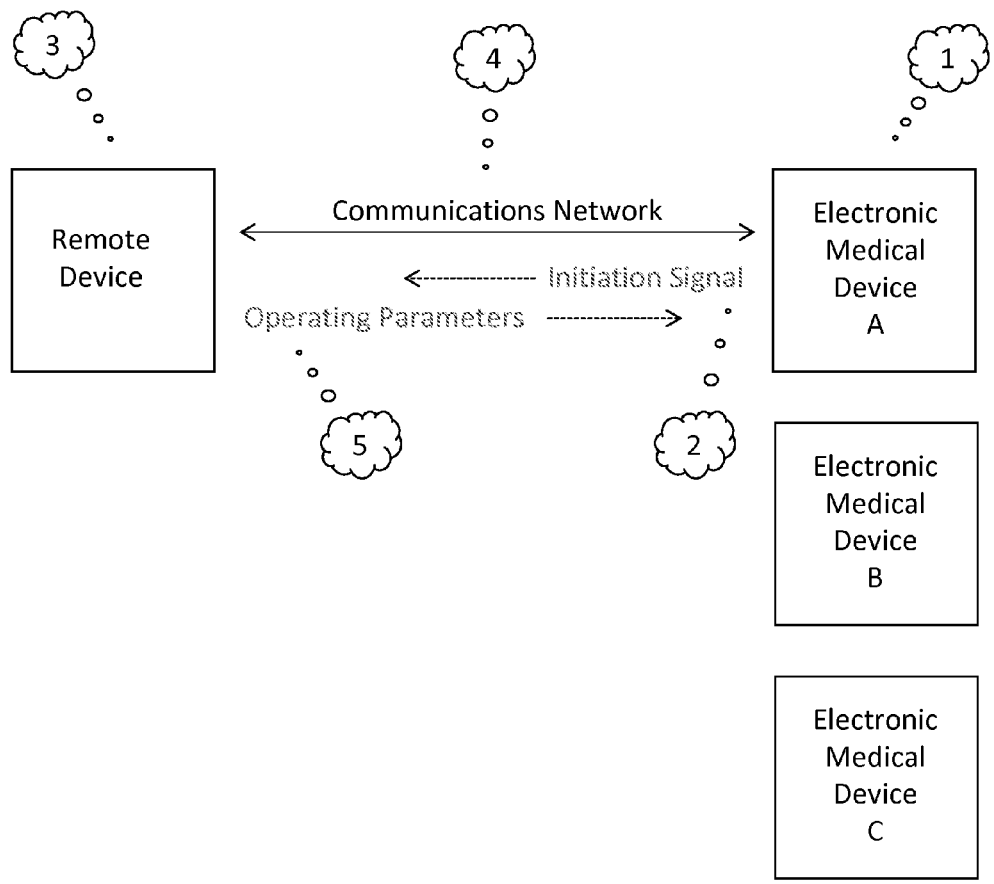
FIG. 1 shows aspects of an embodiment of the invention wherein Electronic Medical Device A (1) transmits Initiation Signal (2) to Remote Device (3) over Communication Network (4), comprising at least one of internet, WAN, LAN, serial or parallel connection, phone line, cable, fiber optics, satellite transmission, microwave transmission, cellular transmission, radio transmission, regular mail, messenger, or other communications network, whereupon Remote Device (3) transmits Operating Parameters (5) over Communication Network (4) to Electronic Medical Device A (1).
Figure 2:
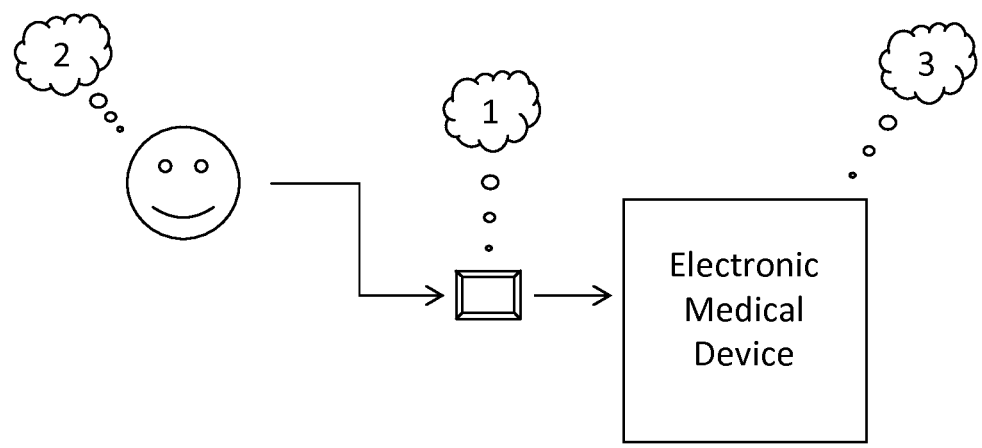
FIG. 2 shows aspects of an embodiment of the invention wherein all or a portion of the program design features are embodied on a memory card, smart card, flash drive, dongle, CD-ROM, digital tape cassette, microchip, external GPU, external video card, or other removable drive media or integrated circuit (1), and introduced by User (1) into Electronic Medical Device (3).
Figure 3:
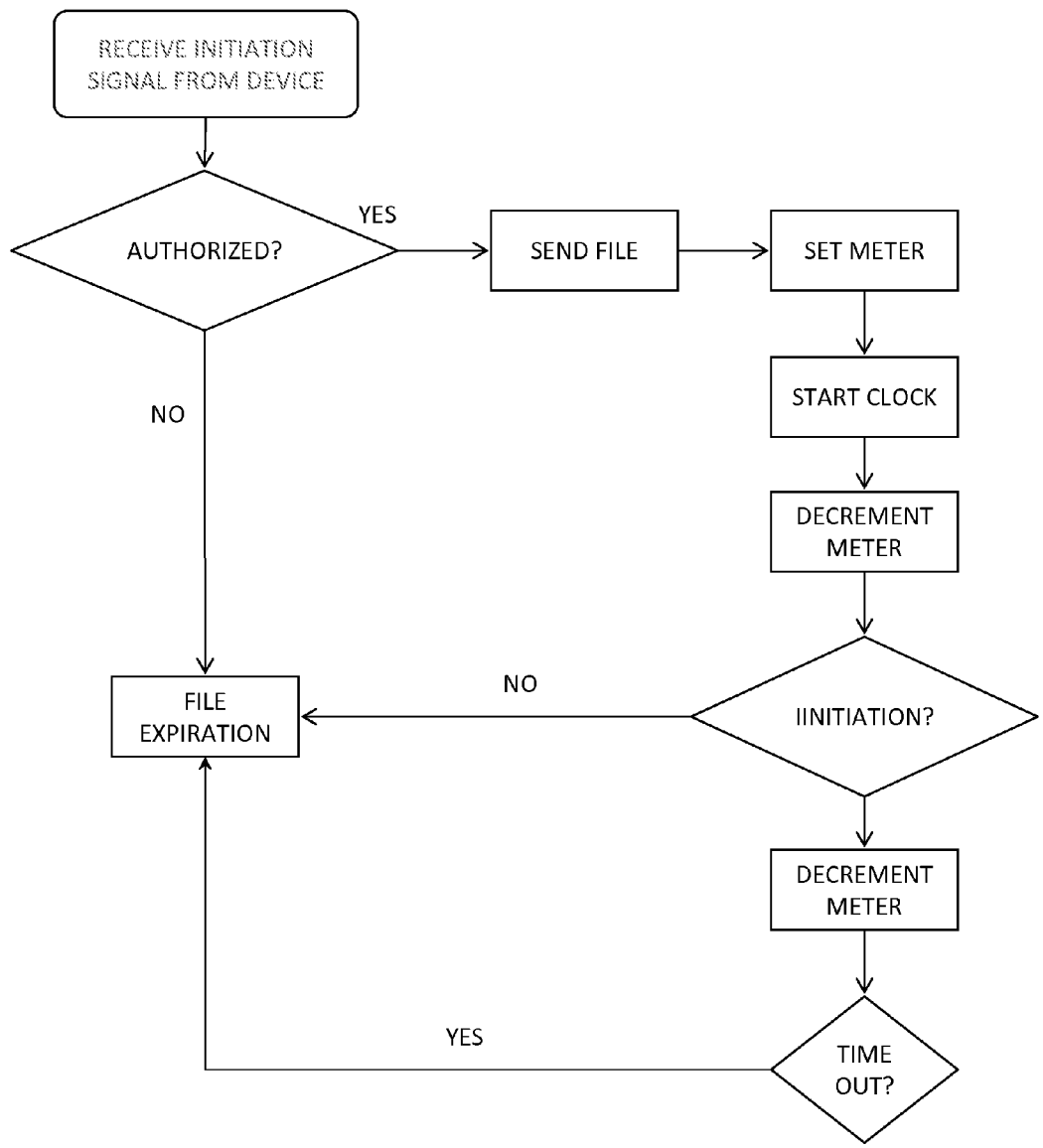
FIG. 3 shows aspects of an embodiment of the invention in the form of a flow chart.

Many electronic medical devices include program design features that direct the operation of the device. Examples of electronic medical devices that operate based on a set of program design features include, without limitation, diagnostic equipment (such as ultrasound and MRI machines, PET and CT scanners, and x-ray machines), therapeutic equipment (such as infusion pumps, medical lasers, and proton therapy machines), life support equipment (such as medical ventilators, anesthetic machines, heart-lung machines, ECMO, and dialysis machines), medical monitors (such as those used to measure ECG, EEG, blood pressure, and dissolved gases in the blood), medical laboratory equipment (such as those used to automates or help analyze blood, urine, and genes).

The program design features that direct the operation of the device can be implemented using one or more computer systems. An exemplary computer system can include software, monitor, cabinet, keyboard, and mouse. The cabinet can house familiar computer components, such as a processor, memory, mass storage devices, and the like. Mass storage devices may include mass disk drives, floppy disks, Iomega ZIP TM disks, magnetic disks, fixed disks, hard disks, CD-ROMs, recordable CDs, DVDs, DVD-R, DVDRW, Flash and other nonvolatile solid-state storage, tape storage, reader, and other similar media, and combinations of these. A binary, machine-executable version of the software of the present invention may be stored or reside on mass storage devices. Furthermore, the source code of the software of the present invention may also be stored or reside on mass storage devices (e.g., magnetic disk, tape, or CD-ROM). Furthermore, a computer system can include subsystems such as central processor, system memory, input/output (I/O) controller, display adapter, serial or universal serial bus (USB) port, network interface, and speaker. The present invention may also be used with computer systems with additional or fewer subsystems. For example, a computer system could include more than one processor (i.e., a multiprocessor system) or a system may include a cache memory. A device driver or software driver might be employed to facilitate interaction between the computer system and the electronic medical device.

The program design features of most electronic medical devices reside in the device itself and therefore are easily discovered by reverse engineering. In most cases, however, these features can be introduced into the device from an external source for only so long as necessary for each operation of the device, thereby making the reverse engineering of these features more difficult (or even impossible) and preserving a greater degree of design secrecy.

The program design features of an electronic medical device can comprise software or can be embedded in hardware. If these features comprise software, the software can reside on the device itself, on a removable drive medium (including memory cards, smart cards, flash drives, dongles, CD-ROMs, and digital tape cassettes), or on a remote computer or other external device (in which case all or a portion of the program design features can be delivered via the internet or a WAN, LAN, serial or parallel connection, phone line, cable, fiber optics, satellite transmission, microwave transmission, cellular transmission, radio transmission, regular mail, messenger, or other communications network). If these features are embedded in hardware, the hardware can consist of a microprocessor or other integrated circuit and can reside on the device itself, on a removable medium (including microchips, external GPUs, and external video cards), or on a remote computer or other external device (in which case all or a portion of the program design features can be delivered via the internet or a WAN, LAN, serial or parallel connection, phone line, cable, fiber optics, satellite transmission, microwave transmission, cellular transmission, radio transmission, regular mail, messenger, or other communications network).

In one embodiment, all or a portion of the program design features are encoded prior to transmission or delivery to the device, during transmission or delivery to the device, or both. In another embodiment of the invention, all or a portion of the program design features are encrypted prior to transmission or delivery to the device, during transmission or delivery to the device, or both. In yet another embodiment of the invention, none of the program design features is encode or encrypted prior to transmission or delivery to the device, during transmission or delivery to the device, or both.

In one embodiment of the invention, at least a portion of the program design features becomes unavailable to the device after the occurrence of at least one event. In one particular such embodiment, access to the program expires upon (a) the passage of a first period of time from entry of the program into the device if the procedure is not initiated within that period of time, (b) the passage of a second period of time from initiation of the program, wherein the second period of time is approximately equal to the estimated period of time for the procedure, or (c) both. In another particular such embodiment, access to the program expires upon tampering with the device, its housing, or both.

As used in this application, the term "programs" includes, without limitation, device drivers, application programs, system programs, utility programs, data files, program files, executable files, configuration files, directory files, I/O files, and I/O streams. "Transmission" to a device includes, without limitation, transmission for storage on a hard drive or other permanent storage medium, transmission for temporary storage in RAM or other temporary storage medium, or transmission by data stream in which no data are stored on the device.

A variety of methods for ensuring that program access expires after a specified period of time are well-known in the art. Some such methods, for example, rely on expiration of the programs themselves, e.g., Infralution Licensing System (Infralution, Mitcham, Australia) and ExeShield (Moonlight Software Inc., Vancouver, BC, Canada). Other methods rely on the impermanence of the files themselves, e.g., temporary files, temporary storage in random access memory (RAM), data buffers, and disk and file caches. More such methods exist and are well-known in the art.

In one embodiment of the invention, the program design features of a medical laser device comprise software that directs proprietary operating parameters of the laser, including its energy output, beam diameter, pulse width, repetition rate, spot separation, line separation, and number of scans. The procedure time for the device is never no greater than 20 seconds from initiation. The device is connected to the internet, and the software resides on a remote computer under the control of the device distributor. When the device is activated for a procedure, the remote computer is notified, and all or a portion of the operational program is transmitted over the internet from the remote computer to a data buffer on the device. The data buffer is pre-set to clear on the first to occur of (a) two minutes after the program is transmitted, if the procedure is not commenced prior to that time, or (b) 20 seconds after the commencement of the procedure. The laser operator commences the procedure and completes it within the 20-second period. The buffer clear at the end of the 20-second period, and the operating program no longer resides on the laser device. Attempts to determine the operating parameters of the laser through reverse engineering are futile because the data no longer reside on the device.

In another embodiment of the invention, the program design features of a dialysis machine comprise software that directs proprietary operating parameters of the machine. The procedure time for this particular treatment session is three hours from initiation. The machine is connected to a satellite receiver, and the software resides on a remote computer under the control of the distributor. When the machine is activated, the remote computer is notified, and a file containing the all or a portion of the operational program is transmitted from the remote computer to the machine via satellite. The file is pre-set to expire on the first to occur of (a) five minutes after the program is transmitted, if the treatment session is not initiated prior to that time, and (b) three hours after the commencement of the treatment session. The medical personnel fails to initiate the treatment within five minutes. The file expires at the end of the five-minute period, and the operating program no longer resides on the machine. When prospective competitors attempt to reverse-engineer the program design features of the equipment, they are unsuccessful because those features are no longer resident on the device.

In yet another embodiment of the invention, the program design features of a proton therapy machine are embedded on a microchip that directs the proprietary operating parameters of the machine. The microchip is housed on a secure microchip holder and does not reside on the projector. (Microchip holders are well-know to those in the art. See, e.g., Fernandez-la-Villa, et al., New Analytical Portable Instrument for Microchip Electrophoresis with Electrochemical Detection, 31 Electrophoresis 2641-49 (2010).) The maximum procedure time for a single performance of the machine is one hour. The microchip holder is inserted into a slot in the machine. Access to the program design features is pre-set to expire on the first to occur of (a) one hour after the microchip holder is inserted into the machine, if the machine is not activated prior to that time, (b) two hours after activation of the machine, or (c) opening any portion of the machine housing. Ten minutes after the microchip holder is inserted into the machine, a prospective competitor opens the machine housing in an attempt to reverse-engineer the program design features of the machine. The prospective competitor is unsuccessful, however, because those features are no longer resident on the projector.

One of ordinary skill in the art would recognize many other variations, modifications, and alternatives. The above examples are merely illustrations, which should not unduly limit the scope of the claims herein. It is also understood that the examples and embodiments described herein are for illustrative purposes only and that various modifications or changes in light thereof will be suggested to persons skilled in the art and are to be included within the spirit and purview of this application and scope of the appended claims.

The invention claimed is:

1. A system for protecting the secrecy of a predetermined treatment parameter for an electronic medical device comprising:
   the device,
   wherein the device is capable of performing a medical procedure on a patient,
   the device comprises memory,
   the memory is configured to receive transmission of a digital file over a communications network,
   the file comprises the parameter,
   the parameter comprises at least one trade secret,
   at least a portion of the parameter is omitted from the device at a first point in time prior to commencement of the procedure,
   at least a portion of the parameter is transmitted to the memory at a second point in time, which second point in time is subsequent to the first point in time, but prior to completion of the procedure,
   at least a portion of the parameter is encrypted prior to transmission,
   at least a portion of the procedure is performed by the device as directed by the parameter, and
   at least a portion of the parameter becomes unavailable to the device after the second point in time and the occurrence of at least one predetermined event, and the manner by which the at least a portion of the parameter becomes unavailable to the device is automatic clearing of the at least a portion of the parameter from the memory.

2. The system of claim 1 wherein the device generates laser energy.

3. The system of claim 1 wherein the network comprises the internet.

4. The system of claim 1 wherein the network comprises at least one of a WAN, LAN, serial or parallel connection, phone line, cable, fiber optics, satellite transmission, microwave transmission, cellular transmission, radio transmission, regular mail, or messenger.

5. The system of claim 1 wherein the predetermined treatment parameter is not customized for the patient.

6. The system of claim 1 wherein the predetermined treatment parameter is customized for the patient.

7. The system of claim 1 wherein the predetermined event comprises the passage of a predetermined period of time.

8. The system of claim 7 wherein the period of time comprises approximately the estimated period of time from commencement of the transmission of the predetermined treatment parameter through commencement of the procedure.

9. The system of claim 7 wherein the period of time comprises approximately the estimated period of time from commencement of the transmission of the predetermined treatment parameter through completion of the procedure.

10. The system of claim 1 wherein the predetermined event comprises tampering with the device.

11. The system of claim 10 wherein the device is contained within a housing, and the tampering comprises tampering with the housing.

12. The system of claim 1 wherein at least a portion of the memory comprises temporary memory.

13. The system of claim 1 wherein the predetermined treatment parameter is transmitted to the device from a remote computer.

14. The system of claim 2 wherein the predetermined treatment parameter comprises at least one of energy output, beam diameter, pulse width, repetition rate, spot separation, line separation, and number of scans.

15. A method for protecting the secrecy of a predetermined treatment parameter for an electronic medical device comprising:
   transmitting a digital file to the,
   wherein the device is capable of performing a medical procedure on a patient,
   the device comprises memory,
   the memory is configured to receive the transmission over a communications network,
   the file comprises the parameter,
   the parameter comprises at least one trade secret,
   at least a portion of the parameter is omitted from the device at a first point in time prior to commencement of the procedure,
   at least a portion of the parameter is transmitted to the memory at a second point in time, which second point in time is subsequent to the first point in time, but prior to completion of the procedure, at least a portion of the parameter is encrypted prior to transmission, at least a portion of the procedure is performed by the device as directed by the parameter, and at least a portion of the parameter becomes unavailable to the device after the second point in time and the occurrence of at least one predetermined event, and the manner by which the at least a portion of the parameter becomes unavailable to the device is automatic clearing of the at least a portion of the parameter from the memory.

16. The method of claim 15 wherein the device generates laser energy.

17. The method of claim 15 wherein the network comprises the internet.

18. The method of claim 15 wherein the network comprises at least one of a WAN, LAN, serial or parallel connection, phone line, cable, fiber optics, satellite transmission, microwave transmission, cellular transmission, radio transmission, regular mail, or messenger.

19. The method of claim 15 wherein the predetermined treatment parameter is not customized for the patient.

20. The method of claim 15 wherein the predetermined treatment parameter is customized for the patient.

21. The method of claim 15 wherein the predetermined event comprises the passage of a predetermined period of time.

22. The method of claim 21 wherein the period of time comprises approximately the estimated period of time from commencement of the transmission of the predetermined treatment parameter through commencement of the procedure.

23. The method of claim 22 wherein the period of time comprises approximately the estimated period of time from commencement of the transmission of the predetermined treatment parameter through completion of the procedure.

24. The method of claim 15 wherein the predetermined event comprises tampering with the device.

25. The method of claim 24 wherein the device is contained within a housing, and the tampering comprises tampering with the housing.

26. The method of claim 15 wherein at least a portion of the memory comprises temporary memory.

27. The method of claim 15 wherein the predetermined treatment parameter is transmitted from a remote computer.

28. The method of claim 16 wherein the predetermined treatment parameter comprises at least one of energy output, beam diameter, pulse width, repetition rate, spot separation, line separation, and number of scans.

\* \* \* \* \*